United States Patent Office 3,429,770
Patented Feb. 25, 1969

3,429,770
PLYWOOD GLUE EXTENDER OF DENSIFIED WALNUT SHELL FLOUR AND COMPOSITIONS CONTAINING IT
Joseph W. Ayers, Easton, Pa., assignor to Agrashell, Inc., Los Angeles, Calif., a corporation of Delaware
No Drawing. Filed Dec. 14, 1965, Ser. No. 513,844
U.S. Cl. 161—262      9 Claims
Int. Cl. C09j 3/16

ABSTRACT OF THE DISCLOSURE

An extender that is used in the preparation of plywood adhesive solutions of reduced resin requirements and with desired working, holdout and bonding properties, comprises a walnut shell flour the particles of which have been densified by compression and, by weight, at least 95% will pass through a 325 mesh screen, said particles being predominately not larger than 20 microns in size; this flour can be prepared by ball-milling a flour obtained by attrition-milling English walnut shells to predominantly a minus 325-mesh screen size.

---

This invention relates to a new and improved plywood glue extender, to mixtures and plywood glues containing the new extender and to plywood bonded by the use of such glues.

It is well known that flours of walnut shells, peach pits and similar relatively non-fibrous woody vegetable shells (by which is meant herein both the woody husks or shells proper of varieties of nuts and the endocarps or stones of fruits known as drupes) have been used as extenders of the thermosetting resin content of solutions used as adhesives or glues in plywood manufacture. On the other hand, these non-fibrous woody shell flours as heretofore known have important shortcomings in such use, particularly in respect to the spreading and hold-out properties and the water tolerance of the adhesive solutions made to contain them.

For instance, although English walnut shell flours formerly were employed in large quantities to extend the phenol-aldehyde resin solutions used for bonding plywood, as the aqueous resin solutions so used were made more dilute for greater economy in plywood manufacture, such shell flour extenders became largely supplanted by other extenders capable of giving the glues the required water tolerance along with the necessary spreading and hold-out properties. The hold-out properties of the liquid or uncured glue composition are especially important to the obtention of strong bonds between the layers or veneers of the plywood; for when the resin solution penetrates too far into the veneers in the course of the assembling or the pressing and curing of the plywood, the amounts of resin effective at the glue lines and the strengths of the bonds obtained are correspondingly diminished.

Among the newer extenders which will give the required water tolerance, spreading and hold-out properties to dilute plywood glue compositions are finely divided extracted lignins, finely divided oxidized extracted lignins and ligno-cellulosic flours produced respectively from the non-fibrous component of bark phloem and from residues of the extraction of pentosans by acid hydrolysis from pentosan-containing plant materials such as corncobs or oat hulls. On the other hand, being obtained from plant materials by rather complex chemical processes, these extenders are themselves relatively expensive in comparison with earlier products, though of course they are less costly than the resins extended by their use. Accordingly, there has continued to be a need for less expensive extenders capable of giving the required spreading, hold-out and bonding properties to relatively dilute plywood glue compositions so that the plywood can be produced more economically with glue bonds having the required strength.

It is therefore an important object of the present invention to provide a more economical plywood glue extender and more economical extender and glue compositions which will give the combination of spreading, hold-out and bonding properties required in plywood manufacture. Thus, the costs of plywood adhesive compositions can be reduced while their working, hold-out and bonding properties are maintained well within or above the practical requirements.

According to the present invention, it has been discovered that a remarkable enhancement of the hold-out and bonding properties of the aqueous thermosetting resin solutions used in plywood manufacture, along with the required spreading and other working properties, can be obtained by providing and incorporating in these solutions as an extended thereof a walnut shell flour, such as one produced from English walnut shells, having its particles densified by compression and so finely divided that the greater part of its weight consists of particles not larger than 20 microns in size and at least 95% of its weight will pass through a 325-mesh screen.

It has been found that although known English walnut shell flour of minus 325-mesh grade, which is composed preponderantly by weight of particles passing through a 325-mesh screen, will not give plywood having acceptable bond strengths when used as the extender in a standard plywood glue composition applied and cured by standard test procedures, the specified extremely fine densified material used in like manner will give plywood amply fulfilling all the strength and working requirements of plywood manufacture. This new material appears to give the required effects by enhancing the hold-out properties of the liquid glue composition containing it so that a considerably larger amount of the thermosetting resin solution is kept effective at the glue lines or interfaces of the veneers during the assembly and curing stages of plywood manufacture, there being relatively little penetration of this solution too deeply into the wood structure of the veneers.

The beneficial effect of the new material can be realized by using it either as the only extender or as a principal ingredient of mixtures containing other extenders, in aqueous plywood adhesive solutions which, although made at a reduced cost for the thermosetting resin content and the extender ingredients, have viscosities and working qualties well suited to commercial plywood production and will give bonds fully meeting the strength specifications of the American Plywood Association.

The extremely fine densified walnut shell flour required according to the invention can be prepared by first subjecting dried walnut shells to intensive grinding in a series of passes through an attrition mill or the like, while aspirating the most finely divided particles from the outflow of this fill. The aspiration, as effected, for example, by the use of an air separator, should be regulated so as to give a material having at least 60% of its weight, and preferably more than 70% thereof, composed of particles smaller than 325-mesh screen size. This material, although extremely fine, will not fulfill the purposes of the invention. Instead of being used in the attrition milled form, it is next subjected to extensive treatment in a ball mill the effluent of which is separated, as by an air separator or other precise classifier, until an extremely fine densified product is obtained having most of its weight composed of particles not larger than 20 microns in size

cles sizes, 96.9% of which passed through a 325-mesh screen:

| Size range, microns: | Percent by weight |
|---|---|
| 0–40 | 93.2 |
| 0–30 | 80.0 |
| 0–20 | 52.8 |
| 0–10 | 10.3 |
| 0–5 | 4.1 |

Pieces of the cured plywood panels were tested as described in Example 1. Those cured for 6 minutes showed the following averaged test values:

| | Assembly times | | |
|---|---|---|---|
| | 4 minutes | 30 minutes | 60 minutes |
| Shear strength, p.s.i. | 270 | 230 | 180 |
| Wood failure, percent | 92 | 95 | 90 |

For comparison with the glues and plywoods of the foregoing examples, another plywood glue was prepared and used for the preparation of plywood panels substantially as described in Example 1, except that the extender employed consisted of 100 parts of an English walnut shell flour having a specific gravity of 1.415 and containing but 68.8% by weight of particles passing through a 325-mesh screen and 33% of particles in the size range of 0 to 20 microns.

Pieces of the cured plywood panels obtained with this glue, tested in the same manner as the product of Example 1, showed wood failures much too low (glue line failures too high) to meet the APA specification under practical production conditions as to assembly and cure times. The averaged wood failure values were as follows:

| | Assembly Times | | | | | | | | |
|---|---|---|---|---|---|---|---|---|---|
| | 4 minutes | | | 30 minutes | | | 60 minutes | | |
| | Cures (minutes) | | | | | | | | |
| | 5 | 5½ | 6 | 5 | 5½ | 6 | 5 | 5½ | 6 |
| Wood failure, percent | 5 | 74 | 95 | 45 | 83 | 87 | 82 | 87 | |

While detailed examples and other particulars of the invention have been set forth hereinabove, it will be evident to those skilled in the art that the invention can be utilized in other ways. It is not intended to be limited to particulars of the description except as may be required for fair construction of the appended claims.

What is claimed is:

1. An extender for plywood glue solutions, comprising a densified walnut shell flour consisting essentially of natural walnut shell particles which have been densified by compression and, by weight, are predominantly not larger than 20 microns in size, at least 95% of the weight being particles of less than 325-mesh screen size.

2. An extender according to claim 1, said flour being one of English walnut shells.

3. An extender according to claim 1, wherein another finely divided extender material is present in intimate admixture with said densified walnut shell flour.

4. An extender according to claim 1, said flour being a product of the ball milling of an attrition milled English walnut shell flour at least 60% of the weight of which is composed of particles of less than 325-mesh screen size.

5. An extended liquid adhesive composition for bonding plywood or other laminates, comprising an aqueous dispersion of a thermosetting aldehydic resin plywood adhesive having an extender according to claim 1 dispersed therein in an amount sufficient to give the composition the required spreading consistency.

6. Plywood comprising wood veneers bonded together by interfacial glue layers composed of a composition as defined by claim 5 in a dried and cured state.

7. An extender according to claim 1, the particles of said flour having sizes substantially as follows:

| Size range, microns: | Percent of flour weight |
|---|---|
| 0–40 | At least 93.2 |
| 0–30 | At least 80.0 |
| 0–20 | At least 52.8 |
| 0–10 | At least 10.3 |
| 0–5 | At least 4.1 |

8. An extender according to claim 4, the specific gravity of said densified flour being at least about 3.3% greater than that of said attrition milled flour.

9. An extender according to claim 4, the specific gravity of said densified flour being at least about 3.3% greater than that of said attrition milled flour, and the particles of said densified flour having sizes substantially as follows:

| Size range, microns: | Percent of flour weight |
|---|---|
| 0–40 | At least 93.2 |
| 0–30 | At least 80.0 |
| 0–20 | At least 52.8 |
| 0–10 | At least 10.3 |
| 0–5 | At least 4.1 |

References Cited

UNITED STATES PATENTS

| 2,507,465 | 5/1950 | Ayers | 260—17.2 |
| 2,727,869 | 12/1955 | Ash et al. | 260—17.2 |
| 2,364,721 | 12/1944 | Kassay et al. | 260—9 |

WILLIAM H. SHORT, Primary Examiner.

E. M. WOODBERRY, Assistant Examiner.

U.S. Cl. X.R.

106—288; 161—261; 260—7, 17.2, 17.3, 29.3